(12) United States Patent
Colaco et al.

(10) Patent No.: US 7,925,658 B2
(45) Date of Patent: Apr. 12, 2011

(54) METHODS AND APPARATUS FOR MAPPING A HIERARCHICAL DATA STRUCTURE TO A FLAT DATA STRUCTURE FOR USE IN GENERATING A REPORT

(75) Inventors: Rohit Colaco, Belmont, CA (US); Vishal Jain, Cupertino, CA (US)

(73) Assignee: Actuate Corporation, South San Francisco, CA (US)

( * ) Notice: Subject to any disclaimer, the term of this patent is extended or adjusted under 35 U.S.C. 154(b) by 281 days.

(21) Appl. No.: 10/943,618

(22) Filed: Sep. 17, 2004

(65) Prior Publication Data

US 2006/0064428 A1    Mar. 23, 2006

(51) Int. Cl.
*G06F 17/30* (2006.01)

(52) U.S. Cl. ........ 707/756; 707/610; 707/640; 707/661; 707/674; 707/706; 707/722; 707/736; 707/752; 707/755; 707/758; 707/781; 707/791; 707/802; 707/828; 707/223; 707/206; 717/100; 717/114

(58) Field of Classification Search .................. 707/101, 707/102, 103 R, 3, 610, 640, 661, 674, 706, 707/722, 736, 752, 755, 756, 758, 781, 791, 707/802, 828, 999.101, 999.004; 709/223, 709/206; 717/100, 114
See application file for complete search history.

(56) References Cited

U.S. PATENT DOCUMENTS

| 4,745,560 | A | | 5/1988 | Decker et al. | |
|---|---|---|---|---|---|
| 4,932,021 | A | | 6/1990 | Moody | |
| 5,272,767 | A | | 12/1993 | Asmuth et al. | |
| 5,442,780 | A | * | 8/1995 | Takanashi et al. | 707/1 |
| 5,448,691 | A | | 9/1995 | Motoyama | |
| 5,473,687 | A | | 12/1995 | Lipscomb et al. | |
| 5,491,796 | A | | 2/1996 | Wanderer et al. | |
| 5,523,942 | A | | 6/1996 | Tyler et al. | |
| 5,574,898 | A | | 11/1996 | Leblang et al. | |
| 5,579,519 | A | | 11/1996 | Pelletier et al. | |
| 5,581,756 | A | * | 12/1996 | Nakabayashi | 707/2 |
| 5,586,255 | A | | 12/1996 | Tanaka et al. | |
| 5,621,889 | A | | 4/1997 | Lermuzeaux et al. | |
| 5,629,846 | A | * | 5/1997 | Crapo | 708/705 |
| 5,664,182 | A | | 9/1997 | Nierenberg et al. | |
| 5,706,365 | A | | 1/1998 | Rangarajan et al. | |
| 5,724,581 | A | | 3/1998 | Kozakura | |
| 5,727,145 | A | | 3/1998 | Nessett et al. | |
| 5,812,983 | A | | 9/1998 | Kumagai | |

(Continued)

OTHER PUBLICATIONS

Product Brochure for "Adobe Acrobat" available from Adobe Systems, Incorporated, 1994.

(Continued)

*Primary Examiner* — Syling Yen
(74) *Attorney, Agent, or Firm* — Weaver Austin Villeneuve & Sampson LLP

(57) ABSTRACT

Methods and apparatus for generating a report from hierarchically formatted data are disclosed. First, a data source including one or more files having a hierarchical file format is identified, where each of the files includes one or more data elements. A relational database model is obtained, where the relational database model includes one or more virtual tables, each of the virtual tables including one or more virtual columns. The relational database model is then mapped to the hierarchical file format. A query may be obtained using the virtual relational database. Data is then obtained from the virtual relational database corresponding to the query, thereby enabling a report including the data to be generated.

62 Claims, 17 Drawing Sheets

U.S. PATENT DOCUMENTS

| | | | |
|---|---|---|---|
| 5,826,268 | A | 10/1998 | Schaefer et al. |
| 5,845,304 | A | 12/1998 | Iijima |
| 5,864,848 | A * | 1/1999 | Horvitz et al. .................... 707/6 |
| 5,884,035 | A | 3/1999 | Butman et al. |
| 5,930,746 | A * | 7/1999 | Ting ................................ 704/9 |
| 6,014,666 | A | 1/2000 | Helland et al. |
| 6,148,379 | A | 11/2000 | Schimmel |
| 6,182,029 | B1 * | 1/2001 | Friedman ......................... 704/9 |
| 6,185,576 | B1 | 2/2001 | McIntosh |
| 6,205,452 | B1 | 3/2001 | Warmus et al. |
| 6,249,794 | B1 | 6/2001 | Raman |
| 6,260,044 | B1 | 7/2001 | Nagral et al. |
| 6,272,495 | B1 * | 8/2001 | Hetherington ................ 707/101 |
| 6,295,559 | B1 | 9/2001 | Emens et al. |
| 6,317,837 | B1 | 11/2001 | Kenworthy |
| 6,321,230 | B1 | 11/2001 | Joslin et al. |
| 6,332,146 | B1 | 12/2001 | Jebens et al. |
| 6,684,222 | B1 * | 1/2004 | Cornelius et al. .......... 707/104.1 |
| 6,772,156 | B1 | 8/2004 | Rogers et al. |
| 6,859,805 | B1 | 2/2005 | Rogers et al. |
| 6,948,154 | B1 | 9/2005 | Rothermel et al. |
| 6,985,905 | B2 * | 1/2006 | Prompt et al. ................ 707/102 |
| 6,990,442 | B1 * | 1/2006 | Davis ................................ 704/9 |
| 7,031,956 | B1 * | 4/2006 | Lee et al. ........................... 707/3 |
| 2001/0018708 | A1 | 8/2001 | Shisler et al. |
| 2001/0034733 | A1 * | 10/2001 | Prompt et al. ................ 707/102 |
| 2002/0078068 | A1 * | 6/2002 | Krishnaprasad et al. .. 707/104.1 |
| 2002/0091728 | A1 | 7/2002 | Kjaer et al. |
| 2002/0133484 | A1 * | 9/2002 | Chau et al. ........................ 707/3 |
| 2003/0110191 | A1 | 6/2003 | Handsaker et al. |
| 2004/0163041 | A1 * | 8/2004 | Engel ............................ 715/509 |
| 2005/0203819 | A1 | 9/2005 | Rogers et al. |

OTHER PUBLICATIONS

Product Brochure for "Crystal Reports, v. 3" available from Crystal Computer Services, Inc.

Release regarding "Crystal Info" application available from Crystal Computer Services, Inc., 1996.

Product Brochure for "Crystal Reports Server, v. 4" available from Crystal Services, 1994.

Product Brochure for "Business Objects" available from Business Objects, Incorporated, 1993.

Product Brochure for "IQ Intelligent Query for Windows v. 4.0" available from IQ Software Corporation, 1994.

Seagate Crystal Reports Version 8 User's Guide, Seagate Software, 1999, pp. 22, 31-32, 55, 79-82, 90-95, 104-152, 189-191, 286-303, 306-309, 456-462, 472-484, 589-590, 607-621.

Lucas, Steve, et al, Special Edition Using Crystal Enterprise 8.5, Que Corporation, Jun. 2002, pp. 247-259.

Dobbs, Verlynda, et al, "A Methodology for the Design and Implementation of Virtual Interfaces", Proceedings of the 1985 ACM Annual conference on the Range of Computing, Oct. 1985, pp. 158-173.

http://www.webopedia.com, definition of "template", as defined in the American Heritage Dictionary of the English Language, Fourth Edition, 2000.

* cited by examiner

Example (customers.xml)

102

```
<?xml version="1.0"?>
<customers xmlns:xsi="http://www.w3.org/2001/XMLSchema-instance">
<customerlist>    104
    <customer>    106
108     <CUSTID>101</CUSTID>
110     <CONTACT_LAST>Franco</CONTACT_LAST>
112     <CONTACT_FIRST>Sue</CONTACT_FIRST>
114     <CUSTOMNAME>Signal Engineering</CUSTOMNAME>
116     <PHONE>2035557845</PHONE>
118     <ADDRESS>149 Spinmaker Dr.</ADDRESS>
120     <CITY>New Haven</CITY>
122     <STATE>CT</STATE>
124     <POSTALCODE>97823</POSTALCODE>
126     <CREDITRANK>B</CREDITRANK>
128     <PURCHASEFREQUENCY>B</PURCHASEFREQUENCY>
130     <PURCHASEVOLUME>7</PURCHASEVOLUME>
132     <RFPID>1337</RFPID>
    </customer>
    ;
</customerlist>
</customers>
```

FIG. 1

Level: 1   2   3

Bookstore
    Fiction
        Book
        Book
        Book
    Non-fiction
        Book
        Book

FIG. 6A

Level: 1   2   3   4

Bookstore
    Fiction
        Book
        Book
    Non-fiction
        U.S.
            Book
            Book
        Foreign
            Book
            Book

FIG. 6B

```
<AllData>
    <Category Picture="http://actuate/beverages.jpg">
        <Name>Beverages</Name>
        <Description>With a high shot of caffeine for those times when working on FS </Description>
        <Product>
            <Name>Chai</Name>
            <Order>
                <ID>123</ID>
                <Quantity make = "Indian">35 kgs</Quantity>
                <UnitPrice>23.45</UnitPrice>
            </Order>
        <make>India</make>
        <make>SriLankan</make>
        <make>Chinese</make>
        </Product>
        <Product>
            <Name>Coffee</Name>
        </Product>
        <Product>
            <Name>Coca Cola</Name>
        </Product>
    </Category>
    <Category Picture="http://actuate/seafood.jpg">
        <Name>Seafood</Name>
        <Description>Edible stuff found in the water</Description>
        <Product>
            <Name>Shrimps</Name>
        </Product>
        <Product>
            <Name>Weed</Name>
        </Product>
        <Product>
            <Name>Fish</Name>
        </Product>
    </Category>
</AllData>
```

FIG. 6C

```
<Product>
    <__PK_Product>1</__PK_Product>
    <Name>Chai</Name>
    <Order>
        <__FK_Product>1</__FK_Product>
        <ID>123</ID>
        <Quantity make = "Indian">35 kgs</Quantity>
        <UnitPrice>23.45</UnitPrice>
    </Order>
    <make   __FK_Product = "1">Indian</make>
    <make   __FK_Product = "1">SriLankan</make>
    <make   __FK_Product = "1">Chinese</make>
</Product>
<Product>
    <Name>Coffee</Name>
</Product>
<Product>
    <Name>Coca Cola</Name>
</Product>
```

FIG. 6D

```xml
<Category Picture="http://actuate/beverages.jpg">
        <__PK_CATEGORY>1</__PK_CATEGORY>
        <Name>Beverages</Name>
        <Description> ... </Description>
        <Product>
                <__FK_PRODUCT_CATEGORY>1</__FK_PRODUCT_CATEGORY>
                <Name>Chai</Name>
                <Order>
                        <ID>123</ID>
                        <Quantity>34 kgs</Quantity>
                        <UnitPrice>23.45</UnitPrice>
                </Order>
        </Product>
        <Product>
                <__FK_PRODUCT_CATEGORY>1</__FK_PRODUCT_CATEGORY>
                <Name>Coffee</Name>
        </Product>
        <Product>
                <__FK_PRODUCT_CATEGORY>1</__FK_PRODUCT_CATEGORY>
                <Name>Coca Cola</Name>
        </Product>
</Category>
```

FIG. 6E

```xml
<?xml version="1.0" encoding="UTF-8" ?>
<MonroneyResponse>
  <VehicleLabelResponse>
    <Vehicle>
      <__ID_VehicleLabelResponse>1</__ID_VehicleLabelResponse>
      <vin>DR05715</vin>
      <year>2002</year>
      <interiorColor>Basalt Grey Lthr</interiorColor>
      <exteriorColor>Titanium Grey Metallic</exteriorColor>
    </Vehicle>
    <OptionData>
      <optionText__ID_VehicleLabelResponse="1">convenience</optionText>
        <options__ID_VehicleLabelResponse="1">luxury seating package</options>
        <optionText __ID_VehicleLabelResponse="1">premium sound package</optionText>
        <optionText __ID_VehicleLabelResponse="1">19" alloy wheels</optionText>
    </OptionData>
  </VehicleLabelResponse>
</MonroneyResponse>
```

FIG. 6F

```xml
<COMPANY>
    <__PK_COMPANY>1</__PK_COMPANY>
    <NAME>XMLPROS</NAME>
    <CUSTOMERS>
        <__FK_COMPANY>1</__FK_COMPANY>
        <CUSTOMERS_PURCHVOLUME>7</CUSTOMERS_PURCHVOLUME>
        <CUSTOMERS_COMPANY>Signal Engineering</CUSTOMERS_COMPANY>
        <CUSTOMERS_REPID>1337</CUSTOMERS_REPID>
        <CUSTOMERS_CONTACT_NAME>
        <CUSTOMERS_CONTACT_FIRST>Sue</CUSTOMERS_CONTACT_FIRST>
        <CUSTOMERS_CONTACT_LAST>Franco</CUSTOMERS_CONTACT_LAST>
        </CUSTOMERS_CONTACT_NAME>
    </CUSTOMERS>
    <ITEMS>
        <__FK_COMPANY>1</__FK_COMPANY>
        <ITEMS_PRICEQUOTE>340</ITEMS_PRICEQUOTE>
        <ITEMS_ITEMCODE>MDSPL04</ITEMS_ITEMCODE>
    </ITEMS>
</COMPANY>
```

FIG. 6G

```
<COMPANY>
    <__PK_COMPANY>1</__PK_COMPANY>
    <NAME>XMLPROS</NAME>
    <CUSTOMERS>
        <__FK_COMPANY>1</__FK_COMPANY>
        <CUSTOMERS_PURCHVOLUME>7</CUSTOMERS_PURCHVOLUME>
        <CUSTOMERS_COMPANY>Signal Engineering</CUSTOMERS_COMPANY>
        <CUSTOMERS_REPID>1337</CUSTOMERS_REPID>
        <CUSTOMERS_CONTACT_NAME>
        <CUSTOMERS_CONTACT_FIRST>Sue</CUSTOMERS_CONTACT_FIRST>
        <CUSTOMERS_CONTACT_LAST>Franco</CUSTOMERS_CONTACT_LAST>
        </CUSTOMERS_CONTACT_NAME>
    </CUSTOMERS>
    <ITEMS>
        <__FK_COMPANY>1</__FK_COMPANY>
        <ITEMS_DESC>32 x 16 DSP, 3.3 volts</ITEMS_DESC>
        <ITEMS_CATEGORY>DSP</ITEMS_CATEGORY>
        <ITEMS_QUANTITY>160</ITEMS_QUANTITY>
        <ITEMS_ORDERID>1645</ITEMS_ORDERID>
        <ITEMS_PRICEQUOTE>340</ITEMS_PRICEQUOTE>
        <ITEMS_ITEMCODE>MDSPL04</ITEMS_ITEMCODE>
        <ITEMS_COLOR __FK_COMPANY = "1">RED</ITEMS_COLOR>
        <ITEMS_COLOR __FK_COMPANY = "1">BLUE</ITEMS_COLOR>
        <ITEMS_COLOR __FK_COMPANY = "1">YELLOW</ITEMS_COLOR>
    </ITEMS>
</COMPANY>
```

FIG. 6H

```
<MYDATA>
    <Category Picture="http://actuate/beverages.jpg">
        <__PK_CATEGORY>1</__PK_CATEGORY>
        <Name>Beverages</Name>
        <Description> ... </Description>
        <Product>
            <__FK_PRODUCT_CATEGORY>1</__FK_PRODUCT_CATEGORY>
            <Name>Chai</Name>
            <Order>
                <ID>123</ID>
                <Quantity>34 kgs</Quantity>
                <UnitPrice>23.45</UnitPrice>
            </Order>
        </Product>
        <Product>
            <__FK_PRODUCT_CATEGORY>1</__FK_PRODUCT_CATEGORY>
            <Name>Coffee</Name>
        </Product>
        <Product>
            <__FK_PRODUCT_CATEGORY>1</__FK_PRODUCT_CATEGORY>
            <Name>Coca Cola</Name>
        </Product>
    </Category>
    <Category Picture="http://actuate/beverages.jpg">
        <__PK_CATEGORY>2</__PK_CATEGORY>
        <Name>Beverages</Name>
        <Description> ... </Description>
        <Product>
            <__FK_PRODUCT_CATEGORY>2</__FK_PRODUCT_CATEGORY>
            <Name>Chai</Name>
            <Order>
                <ID>123</ID>
                <Quantity>34 kgs</Quantity>
                <UnitPrice>23.45</UnitPrice>
            </Order>
        </Product>
        <Product>
            <__FK_PRODUCT_CATEGORY>2</__FK_PRODUCT_CATEGORY>
            <Name>Coffee</Name>
        </Product>
        <Product>
            <__FK_PRODUCT_CATEGORY>2</__FK_PRODUCT_CATEGORY>
            <Name>Coca Cola</Name>
        </Product>
```

FIG. 6I

Example (relationships)

```xml
<?xml version="1.0" encoding="UTF-8"?>
< Categories xmlns:xsi="http://www.w3.org/2001/XMLSchema-instance">
<Category>
    <__PK_CATEGORY>1</__PK_CATEGORY>
    <Name>Beverages</Beverages>
    <Product>
        <__FK_PRODUCT_CATEGORY>1</__FK_PRODUCT_CATEGORY>
        <Name>Chai</Chai>
        <Quantity>25 cups</Quantity>
    </Product>
    <Product>
        <__FK_PRODUCT_CATEGORY>1</__FK_PRODUCT_CATEGORY>
        <Name>Coca cola</Name>
        <Quantity>15 cans</Quantity>
    </Product>
</Category>
</Categories>
```

FIG. 7

Result

|   | A | B | C | D | E |
|---|---|---|---|---|---|
| 1 | Customer 01 | | | | |
| 2 | | Order 2345 | | | |
| 3 | | | $ 98.75 | 100 | $ 9,875.00 |
| 4 | | | $ 5.95 | 50 | $ 297.50 |
| 5 | | | | | $ 10,172.50 |
| 6 | | Order 4531 | | | |
| 7 | | | $ 29.74 | 20 | $ 594.80 |
| 8 | | | $ 5.95 | 24 | $ 142.80 |
| 9 | | | | | $ 737.60 |
| 10 | | | | | $ 10,910.10 |
| 11 | Customer 02 | | | | |
| 12 | | Order 5001 | | | |
| 13 | | | $ 59.34 | 100 | $ 5,934.00 |
| 14 | | | $ 5.95 | 50 | $ 297.50 |
| 15 | | | | | $ 6,231.50 |
| 16 | | Order 6321 | | | |
| 17 | | | $ 48.78 | 20 | $ 975.60 |
| 18 | | | $ 5.95 | 24 | $ 142.80 |
| 19 | | | | | $ 1,118.40 |
| 20 | | | | | $ 7,349.90 |

*FIG. 9*

METHODS AND APPARATUS FOR MAPPING A HIERARCHICAL DATA STRUCTURE TO A FLAT DATA STRUCTURE FOR USE IN GENERATING A REPORT

BACKGROUND OF THE INVENTION

The present invention relates to computer-implemented systems and methods for generating a report. More specifically, the invention relates to systems and methods for mapping a hierarchical data source such as an XML file to a virtual flat data source such as a virtual relational database, thereby enabling a user to generate a report via the virtual flat data source.

Business professionals often deal with and require large amounts of data in the form of reports. Such reports may be generated from much larger collections of data stored in business databases. A typical report accesses dozens to thousands of records (or more) and requires a few seconds to many hours to generate. Typically, the records appearing in a report are organized by one or more level breaks after which totals or subtotals of numerical data are provided. In addition, most reports are highly formatted to provide relevant background information and facilitate understanding. A single report may be related to other reports, and a whole group of reports may be used by many people associated with an enterprise, all of whom need to see the same consistent set of information. Examples of such reports include reports containing records of open orders, sales forecasts, customer statements, and balance sheets.

One type of report that is commonly used is the spreadsheet. A spreadsheet is a grid including a plurality of cells in which formulas may be applied to contents of one or more of the cells within the spreadsheet. Specifically, formulas within a spreadsheet typically refer to cells in the spreadsheet by row and column (e.g., A4). Typically, the contents of the cells of a spreadsheet include values obtained from a data source such as a database. Thus, once the values are obtained from the database, the formulas may be applied. Typically, when a spreadsheet is used, the information in the spreadsheet is primarily numeric with additional textual information such as headers and footers.

Many types of data structures and file types are available for representing and storing data for use in generating reports. Generally, files may be categorized as either having a flat or hierarchical file format. A flat file format is a format in which all data is represented on the same level. In other words, a flat file format does not explicitly include hierarchical, parent-child relationships within the data. Moreover, in a flat file format, spatial relationships between data elements are constant throughout the file. In contrast, a hierarchical file format is one in which hierarchical relationships (e.g., parent-child relationships) between the data elements are represented spatially corresponding to the location of data elements within the file. In other words, relationships between data elements are represented hierarchically through the location and relative distances between data elements. For instance, multiple data elements within a file having a hierarchical file format are commonly nested to indicate hierarchical relationships between the data elements.

One example of a flat file format is a relational database. Generally, in a relational database, each file or table is associated with a particular data element. For instance, a customer file or table is associated with the data element "customer." Each file or table includes a plurality of columns that correspond to a plurality of fields in the customer table. Thus, each row in a customer table corresponds to a particular customer. For instance, exemplary columns in a customer file may include name, address, and phone number. In this manner, information for multiple customers may be stored as multiple rows in a single customer file or table. This relational database format is considered flat since the location of the data fields or elements with respect to one another within the file is irrelevant, and does not denote any additional information with respect to the relationship between the data elements.

One example of a hierarchical file format is an Extensible Markup Language (XML) file. FIG. 1 is a diagram illustrating an exemplary XML file. In this example, the XML file 102 is a customers list 104 in which data for each customer 106 includes a customer identifier 108, last name of the customer contact 110, first name of the customer contact 112, customer name 114, phone number 116, address 118, city 120, state 122, postal code 124, credit rank 126, purchase frequency 128, purchase volume 130, and representative identifier 132. As shown, the hierarchical relationships between data elements are represented by indentations of the data elements within the file. In other words, the data elements are explicitly nested to indicate hierarchical relationships between the data elements.

Such hierarchical file formats provide various advantages. For instance, XML is a well-known standard recommended by the World Wide Web Consortium for sharing information formats and data on the World Wide Web, intranets and elsewhere. Unfortunately, it is generally difficult to query a hierarchical file such as an XML file. In addition, many users prefer to use a flat file format such as a relational database. Moreover, many off-the-shelf tools for querying a flat format such as a relational database are available. Accordingly, it would be beneficial if such tools could be leveraged to enable complex queries to be processed.

In view of the above, it would be beneficial if a user could access data stored in a hierarchical file format via a simpler query to a flat file or database.

SUMMARY OF THE INVENTION

Methods and apparatus for generating a report are disclosed. This is accomplished by mapping a virtual flat data source such as a relational database to a hierarchical file format. In this manner, a user may query the virtual relational database to enable a report to be generated.

In accordance with one aspect of the invention, a method of generating a report includes identifying a data source including one or more files having a hierarchical file format including one or more data elements. In addition, a relational database model (i.e., virtual relational database) is obtained, where the relational database model includes one or more virtual tables, each of the virtual tables including one or more virtual columns. The relational database model is then mapped to the hierarchical file format. A user may then query the virtual relational database to generate a report.

In accordance with one embodiment, the relational database model is mapped to the hierarchical file format by mapping each virtual table and virtual column to either a path or name in the hierarchical file format. When the identified hierarchical files are parsed, the data is stored in an intermediary growable, scalable and incremental data structure such as a tree data structure (e.g., balanced tree). In this manner, the data is stored in association with the mapping between the relational database model and the hierarchical file format. The data that is stored may be the data that is requested in a specific user query or, alternatively, the data may be all data within the identified data source, thereby enabling the data to be retrieved using subsequent queries to the virtual relational database.

In accordance with another aspect of the invention, a user interface is provided. In accordance with one embodiment, a user interface is provided to enable a user to map a hierarchical file format to a virtual relational database. In addition, the present invention enables a user to create a report by querying a virtual relational database. In other words, the user views and establishes the format of the report to be generated from what appears to be a relational database.

In accordance with another aspect of the invention, a virtual relational database including one or more virtual tables is obtained, where each of the virtual tables includes one or more virtual columns and where the virtual relational database is mapped to at least a portion of data obtained from a data source including one or more files having a hierarchical file format. A query is defined and obtained using the virtual relational database. The data corresponding to the query is then obtained from the virtual relational database, thereby enabling a report including the data to be generated.

In accordance with one embodiment, the data that is obtained is obtained from an intermediary data structure that maps the hierarchical file format to the virtual relational database. In this manner, a user may easily query the virtual relational database, while maintaining the mapping to the hierarchical files transparent to the user.

These and other features of the present invention will be presented in more detail in the following detailed description of the invention and the associated figures.

BRIEF DESCRIPTION OF THE DRAWINGS

FIG. 1 is a diagram illustrating an exemplary XML file.

FIGS. 6A and 6B together illustrate examples of hierarchical files and the result of selecting a particular element name or path for mapping to a virtual column in accordance with one embodiment of the invention.

FIG. 6C is an exemplary XML file for which primary and foreign keys are auto-generated in accordance with one embodiment of the invention.

FIG. 6D is an exemplary XML file illustrating an application of a key generation rule to the exemplary XML file in accordance with one embodiment of the invention.

FIG. 6E is an exemplary diagram illustrating the insertion of the primary and foreign keys to link a CATEGORY table and a PRODUCT table in accordance with one embodiment of the invention.

FIG. 6F is an exemplary XML file illustrating conditions for generating keys for non-nested elements having a common ancestor, where the common ancestor is not associated with a table in accordance with one embodiment of the invention.

FIG. 6G is an exemplary XML file illustrating conditions for generating keys for non-nested elements having a common ancestor, where the common ancestor is associated with a table in accordance with one embodiment of the invention.

FIG. 6H is an exemplary XML file illustrating the insertion of primary and foreign keys in a file having repeating leaf nodes in accordance with one embodiment of the invention.

FIG. 6I is an exemplary XML file illustrating the setting of values for auto-generated keys or identifiers (IDs) in accordance with one embodiment of the invention.

FIG. 7 is an exemplary XML file illustrating the insertion of primary and foreign keys within the XML file in accordance with one embodiment of the invention.

FIG. 9 is a diagram illustrating an exemplary report generated from a report template in accordance with various embodiments of the invention.

DESCRIPTION OF THE PREFERRED EMBODIMENTS

Figure 2:
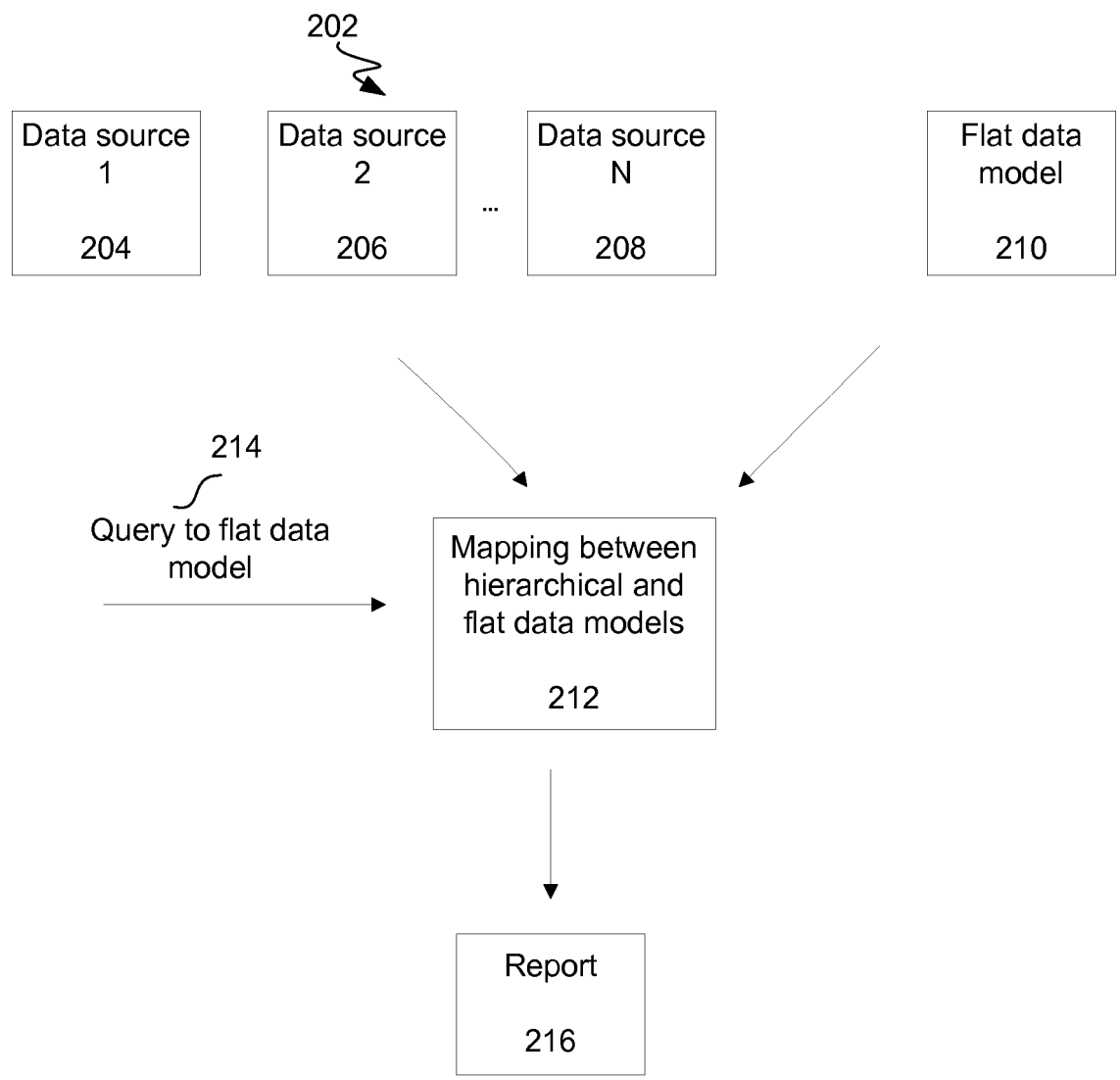
FIG. 2 is a block diagram illustrating a system in which the present invention may be implemented.

A "report" generally is a highly formatted list of data containing several, even thousands of records. Very often, reports are characterized by "level breaks" between members of a group of records provided in the report.

A "section" is a part of a report containing data having a common feature or purpose. Most reports contain sections separated by level breaks. However, other sections may also be used. These include, for example, sequential or parallel sections containing different types of data. For example, the data for a given customer in a report may be divided into an order section describing orders placed by the customer, a problem section noting any problems that the customer is having, and a potential order section describing potential orders to be placed by the customer.

"Level breaks" are provided at each division among members of a high level group appearing in a report. For example, consider a report shown in FIG. 9 listing customers, orders placed by the customers, and items in each order. The report is structured such that it first displays (beginning at the top of the report) all orders of the first customer. Within the display of each such order, there is displayed the items of the order. Each item may be displayed with information such as a price and/or a part number or relevant information needed by the report user. After all of the first customer's orders (and all items in those orders) have been displayed sequentially, a second customer is identified with attendant orders and items also listed. The division between the first customer and the second customer in the report constitutes a "level break." Further, each division between the individual orders under a given customer constitutes a level break. In the example of FIG. 9, both customers and orders constitute "high level" groups because their members (individual customers and orders) each contain information about lower level components, such as the items in an order. Generally, only such "high level" groups have level breaks. The divisions between members of the lowest level groups such as items are not deemed to constitute level breaks.

Level breaks are conveniently used in reports to present "totals" of the information pertaining to a particular high level entity. For example, a first customer level break shown in FIG.

9 provides a total dollar volume of orders placed by that customer. Further under each order of that customer, a separate total number of items and total dollar value is provided.

The present invention enables a user to generate a report template and/or report (e.g., spreadsheet report) such as that illustrated in FIG. 9. In order to generate a spreadsheet report from a report template, the report may be generated and stored using report objects. The report template defines the format in which data will be presented in a spreadsheet report generated from the report template. Once the report template has been generated, a server obtains the report template and obtains data from the appropriate data source as referred to in the report template to generate a spreadsheet report (e.g., Excel document).

The report template (and associated template formulas) may be implemented in the form of an object. An object may have inherent properties and operations based on a hierarchical relationship. Typically, a higher level class is defined broadly and then refined into to successively finer "subclasses." Each such subclass incorporates, or "inherits," all of the properties of its "superclass" and adds its own unique properties. The properties of the superclass need not be repeated in each subclass. Objects and object-oriented programming generally are described in many texts. One suitable introductory text is "Object-Oriented Modeling and Design" by Rumbaugh et al., Prentice-Hall, Inc., Englewood Cliffs, N.J., 1991 which is incorporated herein by reference for all purposes.

A "template object" is a persistently stored object containing many other objects and logical arrangements of those objects required to generate and display a given report. Thus, a template object may contain objects as described below, which may be used for representing a report template used for generating pages, frames, level breaks between records, etc., all for a single report. The template object may be stored in a compressed form on non-volatile memory such as a magnetic hard disk, a floppy disk, a CD ROM, etc. When the report template is to be displayed or otherwise accessed, at least part of the corresponding template object may be loaded into a volatile memory such as RAM for access by a computer CPU.

In order to generate a report, the user builds a query such as a conventional SQL (Structured Query Language) query indicating the field names for which data is to be obtained. The query also indicates the manner in which the data is to be sorted. For instance, an example query is "select customerID, orderID, itemID from orders order by customer, order". The query may therefore indicate that data for order items is to be sorted by order, and each order is to be sorted by customer. A query processor then queries the data source (e.g., one or more files) using the query to obtain the data to be used to generate the report.

As described above, in order to obtain data for use in generating the report, a query processor queries the data source. In accordance with one embodiment, the data source includes one or more files having a hierarchical file format (e.g., XML). However, to the user, the data source appears to be a flat data source such as a relational database.

Embodiments of the invention described below enable a hierarchical file format to be mapped to a flat file format, thereby enabling a query to be submitted according to the flat file format. In this manner, a user may query data for use in generating a report that appears to the user to be stored in the flat file format. As a result, the present invention provides a user-friendly user interface for generating reports from a data source including one or more files having a hierarchical file format. Exemplary hierarchical file formats include, but are not limited to, XML and XML Schema Definition (XSD). Exemplary flat file formats include, but are not limited to, databases such as relational databases.

FIG. 2 is a block diagram illustrating a system in which the present invention may be implemented. The present invention enables a data source 202 including one or more files 204, 206, 208 having a hierarchical file format to be mapped to a flat data model 210 such as a relational database model (i.e., virtual relational database), where the relational database model includes one or more virtual tables, each of the virtual tables including one or more virtual columns identifying virtual fields in the relational database model. Thus, the data source 202 may include files having different file formats. For instance, one or more of the files may be in a hierarchical file format. As shown, a mapping 212 between the hierarchical and flat data models is established such that data may be obtained via a query to the flat data model. A user may then submit a query 214 to the mapping 212 using the flat data model in order to generate a report 216.

Figure 3:
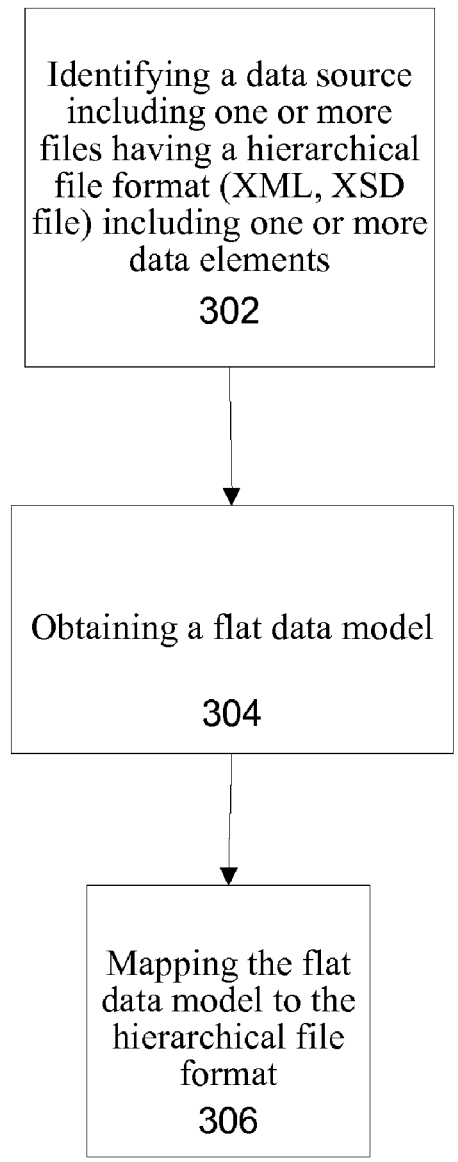
FIG. 3 is a process flow diagram illustrating a method of generating a mapping between a hierarchical file format and a flat file format in accordance with one embodiment of the invention.

FIG. 3 is a process flow diagram illustrating a method of generating a mapping between a hierarchical file format and a flat file format in accordance with one embodiment of the invention. In order to enable a report to be generated, a mapping between a hierarchical file format and a flat file format is established. As shown at block 302, a data source including one or more files having a hierarchical file format (e.g., XML, XSD file) including one or more data elements is identified. Specifically, one or more files may be selected from which data is to be mapped for use in generation of a report. Each of the files may have a different format. In other words, some of the files may have a flat file format, while others may have different hierarchical file formats. Thus, a mapping may be established for each hierarchical file format. As shown at block 304, a flat data model is obtained. Specifically, the flat data model may be selected or defined, as will be described in further detail below. The flat data model is then mapped to the hierarchical file format at block 306 such that data stored in the files having the hierarchical file format can be accessed using a query to the flat data format.

Figure 4:
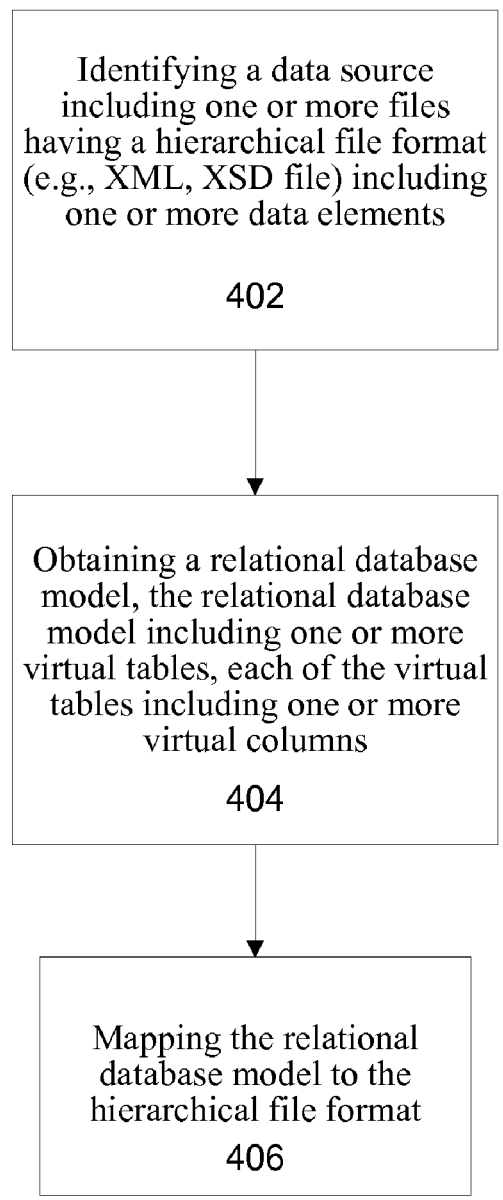
FIG. 4 is a process flow diagram illustrating a method of generating a mapping between a hierarchical file format and a virtual relational database in accordance with one embodiment of the invention.

In accordance with one embodiment, the flat file format corresponds to a relational database. FIG. 4 is a process flow diagram illustrating a method of generating a mapping between a hierarchical file format and a virtual relational database in accordance with one embodiment of the invention. As shown at block 402, a data source including one or more files having a hierarchical file format (e.g., XML, XSD file) is identified, where each hierarchical file including one or more data elements is identified. For instance, one or more files may be registered for use as a data source.

In order to control access to confidential data, different files may be used by engineers during "design time" and by employees during "run time." In other words, the files that are selected as the data source may be separately designated for-design time and run-time. In this manner, access to confidential data may be restricted.

A relational database model is then obtained at block 404. Specifically, the relational database model includes one or more virtual tables, where each of the virtual tables includes one or more virtual columns. The relational database model may be pre-defined or user-defined. The relational database model is then mapped to the hierarchical file format at block 406.

Various methods and data structures may be used to map the flat file format to the hierarchical file format. For instance, a tree data structure may be generated which maps the relational database model to the hierarchical file format. Moreover, a tree data structure, hash tables and map structures may be used to map the relational database model to at least a portion of the data from the data source. Specifically, the data that is mapped may merely be the data that corresponds to a user query or, alternatively, the data that is mapped may be all data that is stored in the hierarchical file format. Specifically, each path in the hierarchical file may be represented by a branch in the tree, which is mapped to a virtual table and virtual column. In addition, the data obtained from the data source may be stored as nodes (i.e., leaves) in the tree. Specifically, each field or row in a virtual table may be stored as an object (e.g., serializable object). In accordance with one embodiment, the tree is a scalable, indexed B-tree. A B-tree is a data structure that maintains an ordered set of data and allows efficient operations to find, delete, insert, and browse the data.

In order to map the relational database model to the hierarchical file format, data is obtained from the hierarchical file(s) (e.g., XML files). In order to obtain the data from the hierarchical file(s), the files can be automatically scanned and parsed to build the mapping (e.g., tree data structure). This may be accomplished by using a standard XML parser such as Xerces, JaxP, and pullparser, available from APACHE, located in Forest Hill, Md., Sun Microsystems, and SOURCEFORGE.net, located at http://wwwsearch.sourceforge.net/pullparser/, respectively. As set forth above, the data that is mapped may be a subset of the data in the data source corresponding to the user query or, alternatively, the data that is mapped may be all data that is stored in the data source. By mapping all data in the data source, the mapping that is stored in the intermediary data structure may be accessed for any subsequent queries.

A user may modify one or more mappings (i.e., table and column definitions) that have been established, as well as delete one or more mappings that have been established. Modifications may include, for example, modifying a table or column definition defining a virtual table or row such that the virtual table or virtual row is defined by a different element name or path in the corresponding file, adding and/or deleting a table or column definition defining a virtual table or row, and adding or deleting or table.

Figure 5A:
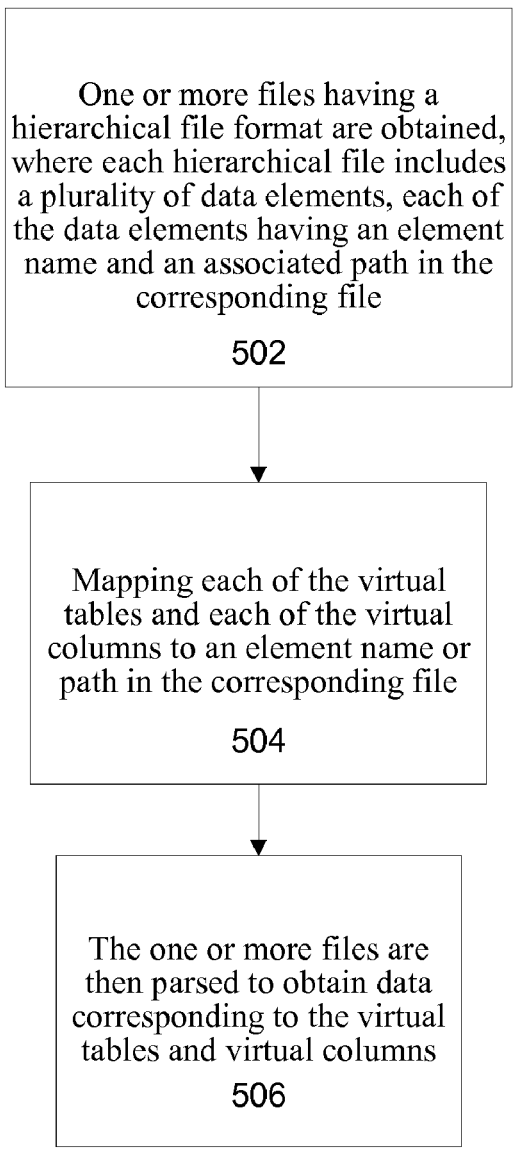
FIG. 5A is a process flow diagram illustrating a method of mapping the hierarchical file format to the relational database model as shown at block 406.

FIG. 5A is a process flow diagram illustrating a method of mapping the hierarchical file format to the relational database model as shown at block 406. As shown at block 502, one or more files having a hierarchical file format are obtained, where each hierarchical file includes a plurality of data elements, each of the data elements having an element name and an associated path in the corresponding file. Each of the virtual tables and each of the virtual columns is then mapped to an element name or path in the corresponding file at block 504. In other words, each of the virtual tables has an associated table definition and each of the virtual columns has an associated column definition, where each table definition and column definition is defined by the element name or path in the corresponding file. The virtual column and virtual table names may be the same as the element name or path in the corresponding file, or may be customized by the user. In this manner, one or more rules for mapping a hierarchical model to a flat model may be generated.

The files are then parsed at block 506 to obtain data corresponding to the virtual tables and virtual columns (e.g., specified in the query, for all data, or for all virtual columns). The data is then stored, as set forth above. In addition, primary and foreign keys may be established, as will be described in further detail below.

Figure 5B:
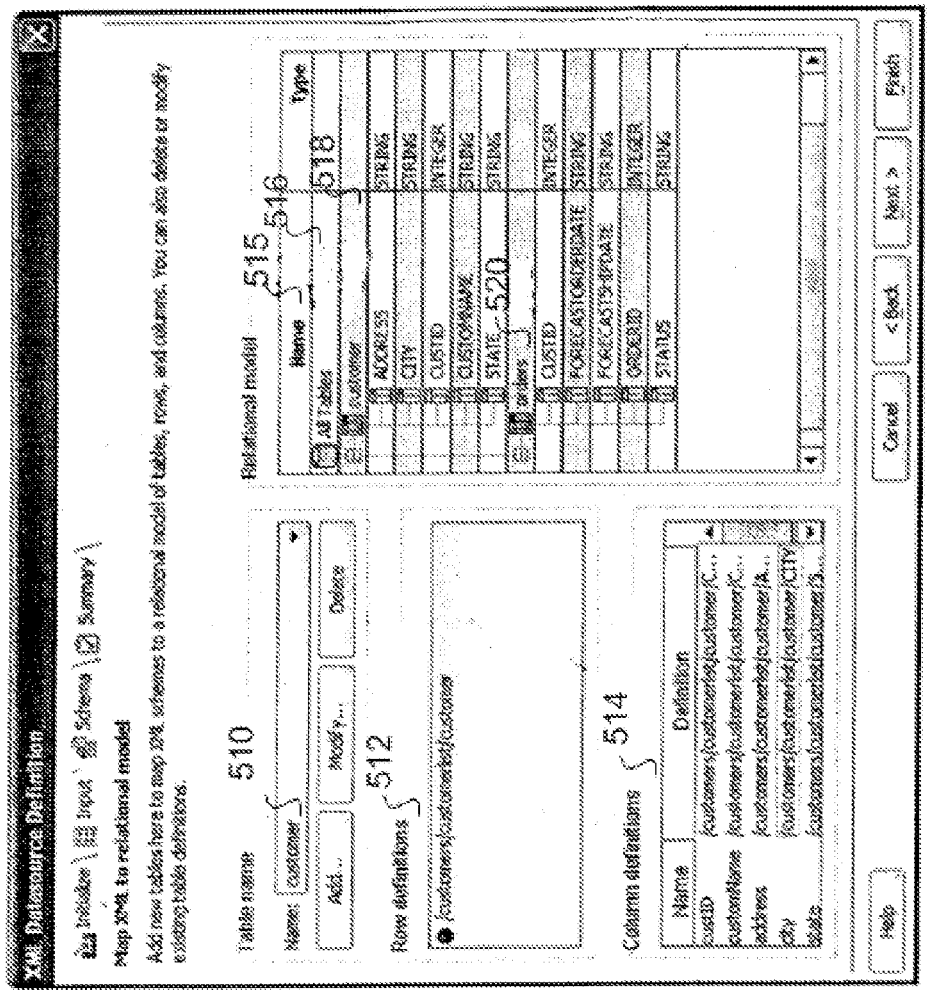
FIG. 5B is a diagram illustrating an exemplary graphical user interface for mapping a hierarchical file format to a relational database model in accordance with one embodiment of the invention.

FIG. 5B is a diagram illustrating an exemplary graphical user interface for mapping a hierarchical file format to a relational database model in accordance with one embodiment of the invention. As shown in FIG. 5B, the user may map a virtual table 510 to an associated table definition 512, which is defined by an element name or path in the corresponding file. Similarly, the user may map a virtual column 514 of a virtual table to an element name or path in the corresponding file. As shown, the virtual column and virtual table names may be the same as the element name or path in the corresponding file, or may be customized by the user. The resulting relational database model 515 includes one or more tables 516, which in this example include a customer table 518 and an orders table 520. The customer table 518 and the orders table 520 include a set of virtual columns 522 and 524, respectively. As shown, a virtual table may be added, modified, or deleted. In this manner, a hierarchical data model such as an XML file is mapped to a flat data model such as a relational database.

FIGS. 6A and 6B together illustrate examples of hierarchical files and the result of selecting a particular element name or path for mapping to a virtual column in accordance with one embodiment of the invention. In these examples, the elements in the hierarchical file(s) are nested. As shown in FIG. 6A, a hierarchical file may be used to identify all books within a bookstore. At the first level of data, the bookstore is identified. At the second level, a fiction and non-fiction category are identified. Within the third level, different books are identified. Thus, the element name "book" may be selected to ensure that all books in both the fiction and non-fiction categories are included in a particular virtual column. Alternatively, the path "bookstore/fiction/book" may be used to ensure that only books within the fiction category are included in a particular virtual column.

As another example, as shown in FIG. 6B, at the first level of data, the term bookstore is identified. At the second level, a fiction and non-fiction category are identified. Within the fiction category at the third level, specific books are identified. However, within the non-fiction category at the third level, U.S. and foreign categories are identified. Within the U.S. and foreign categories, books are identified at the fourth level. In this example, it may be desirable to select the path "bookstore/non-fiction/U.S./book" to associate non-fiction U.S. books with a particular virtual column (e.g., "non-fiction U.S. books). Alternatively, the element name "book" may be associated with a particular virtual column (e.g., "Books in bookstore"). Thus, the element name may correspond to all levels in the hierarchical file format. This may be accomplished through the use of a merge option that is selected by the user. In order to implement this "merge," it may be desirable to merge all data into a single table by including fields from multiple tables. However, it may be preferable to only include books at a particular level. This may be accomplished by identifying a path "bookstore/fiction/book." Alternatively, a single level may be identified by number. In this example, for instance, the element name "book" at level 5 may be used to identify all non-fiction books. Non-fiction books may similarly be identified by path "bookstore/non-fiction."

Once a virtual table has been defined, it may be modified or deleted. For instance, a virtual table may be modified by adding one or more virtual columns to the virtual table. Similarly, one or more virtual columns may be deleted from the virtual table. In this manner, a user may define or modify a virtual table that may be queried for use in generating a report.

In addition to defining each virtual table, it is also desirable to establish a relationship between the virtual tables. This may be accomplished through defining one or more primary keys and/or one or more foreign keys, which may or may not be present. The primary and foreign keys may be user defined upon generation of the virtual relational database, or to modify the virtual relational database. A primary key may be defined as a key for which the value is unique for each instance of an entity. For instance, an employee may have a primary key of social security number or employee id, since the social security number and employee id will be unique for each employee. A foreign key may be defined as a key that identifies the parent entity. For instance, a parent entity for an employee may be the department, and therefore the department identifier may be the foreign key for each employee. Generally, each foreign key and primary key identify a virtual column. Each virtual column may be identified via a virtual column number. Relationships between parent and nested complex data elements in a hierarchy within a file or intermediary data structure may be automatically detected for auto-insertion or manual insertion of the primary and/or foreign keys. Since these primary and foreign keys (e.g., column identifiers) are not present in the hierarchical files, these may be generated while the files are being parsed.

As described above, the relationships between the various tables are specified. This can be done manually by the user or automatically during the process of scanning and parsing the files. Various algorithms may be implemented to support the automatic generation of primary and/or foreign keys.

In accordance with one embodiment, the primary and/or foreign keys are auto-generated, as will be described in further detail below with reference to FIGS. 6C-6I. FIG. 6C is an exemplary XML file for which primary and foreign keys are auto-generated in accordance with one embodiment of the invention. In the following description, items in brackets < > are elements shown in the exemplary XML file. A node or element that "qualifies" as a table has a corresponding table with the same name as the node or element.

Various rules may be implemented to support auto-generation of primary and/or foreign keys. A set of exemplary rules includes a set of three rules. FIG. 6D is a diagram illustrating an application of the first rule to the exemplary XML file in accordance with one embodiment of the invention. First, every table (e.g., <make>) that has an ancestor (e.g., <product>), which contains an additional nested node that qualifies as a table (e.g., <order>) at any level, should have a foreign key (e.g., _FK_Product="1") associated with the corresponding table (e.g., <make>). The primary key will be inserted in the parent node (e.g., <_PK_Product>1</_PK_Product>), and a foreign key will be inserted in the nested node as well (e.g., <_FK_Product>1</_FK_Product>).

Second, every table (e.g., <Order>) that has an Ancestor (e.g., <Product>), that itself qualifies as a table, should have a foreign key (e.g., <_FK_Order_Product>1</_FK_Order_Product>) associated with a primary key (e.g., <_PK_Product>1</_PK_Product>) in the Ancestor (e.g., <Product>).

Third, if by following Rules 1 and 2, a table has both a foreign key and ID for the same ancestor, then the ID can be removed and the foreign key should be considered the sole linking point with respect to the ancestor.

There are some exceptions to the application of the above-described rules. For instance, a user may wish to create a report using only one table. In this case, the user may not want redundant key columns inserted into the dataset to occupy memory.

A user may want to create a report using two tables directly connected. For instance, a CATEGORY table and PRODUCT table may be connected. As another example, a PRODUCT table and ORDER table may be connected. Suppose a report using a direct connection between two tables is provided between the CATEGORY and PRODUCT tables, a primary key is provided in the CATEGORY table and a foreign key is provided in the PRODUCT table.

FIG. 6E is a diagram illustrating the insertion of the primary and foreign keys to link a CATEGORY table and a PRODUCT table in accordance with one embodiment of the invention. In this example, a column called PK_CATEGORY is inserted into the CATEGORY table and a column called _FK_PRODUCT_CATEGORY into the PRODUCT table. For every new CATEGORY row of data created, an auto-incremented value is assigned to _PK_CATEGORY. In addition, for every new PRODUCT row of data parsed from the XML source, a value is assigned to FK_PRODUCT_CATEGORY that is equal to the run time value assigned to the current _PK_CATEGORY value as assigned. Therefore, the values assigned to FK_PRODUCT_CATEGORY and PK_CATEGORY will be equal.

It is important to note that the primary key and foreign key columns need not be inserted into the XML source content, but may be logically and dynamically created as columns associated with each of the table definitions. Internally, the system will assign a new "relationship" between PRODUCT and CATEGORY via the pseudo _PK and _FK columns dynamically created for the two tables. Using this mechanism, reports for all products grouped by category may be generated even though the CATEGORYID link was not explicitly available in the XML content but implied by the hierarchy.

Suppose a report is to be created via an indirect connection between two tables (e.g., CATEGORY and ORDER). The user may choose to define the relationship between these two tables in one of two ways. Specifically, the user may link the tables indirectly (e.g., CATEGORY<->PRODUCT<->ORDER) or directly (e.g., CATEGORY<->ORDER). For example, if the tables are linked directly, the pseudo columns _PK_CATEGORY and _FK_ORDER_CATEGORY are inserted into the appropriate tables (e.g., CATEGORY and ORDER tables). These columns are created once and populated with appropriate values by the XML parser using auto-incremented values during creation of a new row. If while parsing the schema, while auto-generating keys, a duplicate element is identified, a "_num" will be appended to the name of the primary or foreign key or ID.

FIG. 6F is an exemplary XML file illustrating conditions for generating keys for non-nested elements having a common ancestor, where the common ancestor is not associated with a table in accordance with one embodiment of the invention. In this example, two elements, "Vehicle" and "OptionText", are not nested one inside the other. However, both qualify as tables (e.g., each has a table associated with the corresponding element name), while the common ancestor for both "VehicleLabelResponse," does not qualify as a table (e.g., there is not a table associated with the corresponding element name). Thus, identifiers are inserted after/within the two elements. In this example, the naming convention is "_ID_COMMONANCESTORNAME" to create a relationship between the nested elements.

FIG. 6G is an exemplary XML file illustrating conditions for generating keys for non-nested elements having a common ancestor, where the common ancestor is associated with a table in accordance with one embodiment of the invention. For two elements, "Customers" and "Items," which are not nested one inside the other, both qualify as tables and have a common ancestor, "Company," which qualifies as a table. Therefore, elements equivalent of primary keys are inserted in the ancestor elements, and foreign keys are inserted in the child elements.

FIG. 6H is an exemplary XML file illustrating the insertion of primary and foreign keys in a file having repeating leaf nodes in accordance with one embodiment of the invention.

For leaf nodes that are repeating, each repeating leaf node (e.g., ITEMS_COLOR) qualifies as a table. Thus, all keys or IDs needed to create relationships will be added as "attributes" (e.g., appended) since the keys cannot be added as elements (e.g., as a separate row) to a leaf node. Thus, as shown, an attribute enables a particular leaf node to be modified (e.g., appended with a particular attribute) such that it is associated with the desired foreign key.

FIG. 6I is an exemplary XML file illustrating the setting of values for auto-generated keys or identifiers (IDs) in accordance with one embodiment of the invention. At runtime, where keys or IDs have been generated, each time a primary key is created for an element (e.g., Category), the value of the primary key is stored. For each of these elements (e.g., Products), a relationship is created by assigning the same value as a foreign key. When a closing tag (e.g., </Category>) is encountered for that element, the value of the primary key will be incremented.

In this example, when a Category element has been encountered, the primary key value will be incremented (e.g., to the value 1), and the foreign key will be added to all corresponding tables with the value of 1. Once a closing tag for the Category element is encountered, the value of the primary key is incremented to 2, and a foreign key with a value of 2 will be added to all corresponding tables.

FIG. 7 is an exemplary XML file illustrating the insertion of primary and foreign keys within the XML file using a process such as that described above with reference to FIG. 6A-6I in accordance with one embodiment of the invention. In this example, two different virtual tables are implemented. First, a categories table includes a name column. For instance, a category name may be "Beverages." Second, a products table includes a name column and quantity column. For instance, the product name may be "Coca cola." The name column in the categories table serves as the primary key, while the name column in the categories table serves as the foreign key for the products table. In this example, the primary key 702 corresponding to the category name is inserted into the hierarchical XML file or intermediary data structure as the XML file is being parsed. Specifically, a primary key indicator 704 and a virtual column number 706 corresponding to the primary key, category name, is inserted. In addition, the foreign key for each product category is inserted. As shown, a foreign key indicator 708 and associated virtual column number 710 associated with the category name is inserted. Similarly, a foreign key indicator 712 and associated virtual column number 714 associated with the category name is inserted into the hierarchical XML file or intermediary data structure.

Figure 8:
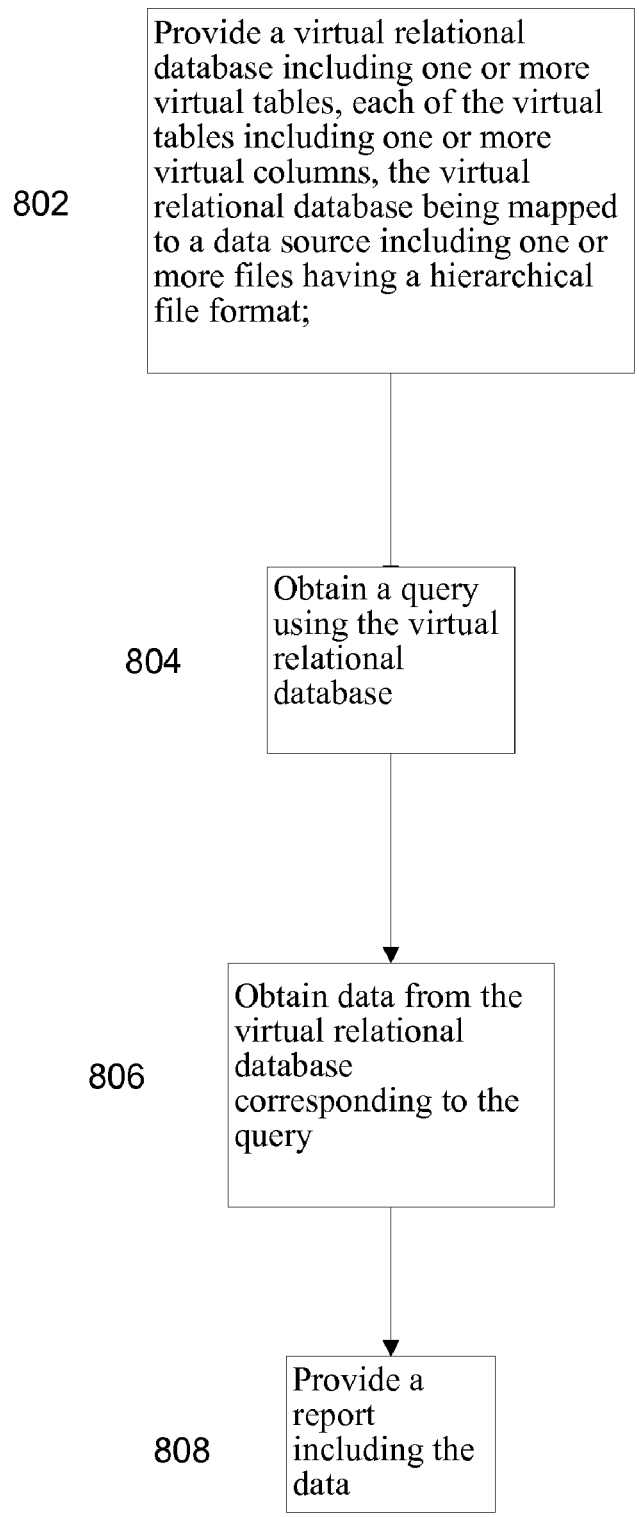
FIG. 8 is a process flow diagram illustrating a method of generating a report using the mapping between the hierarchical file format and the flat file format in accordance with one embodiment of the invention.

FIG. 8 is a process flow diagram illustrating a method of generating a report using the mapping between the hierarchical file format and the flat file format in accordance with one embodiment of the invention. A flat data model such as a virtual relational database is provided to the user at block 802, where the virtual relational database includes one or more virtual tables, each of the virtual tables including one or more virtual columns, the virtual relational database being mapped to a data source including one or more files having a hierarchical file format. It is also possible to hide or unhide virtual columns that are presented to the user. This may be desirable, for instance, to hide or prevent access to data that is high priority or confidential.

A query such as a Structured Query Language (SQL) query is obtained at block 804 using the flat model (e.g., virtual relational database). The query defines one or more values (e.g., associated with fields or data items) to be extracted from the data source. Specifically, the user identifies one or more virtual tables and one or more virtual columns in the virtual relational database. In addition, the user may also generate the format of the data fields to be used for report generation. Specifically, the values may be identified by the virtual table(s) and virtual column(s) within the virtual relational database.

Data is then obtained from the flat data model or virtual relational database corresponding to the query at block 806. As described above, the data in the hierarchical file(s) (as well as other files in the data source) has previously been mapped to the virtual relational database. This mapping may be performed in the original hierarchical files or in one or more intermediary data structures (e.g., tree data structures). Specifically, the data that has been mapped may be only the data corresponding to the virtual tables and columns that is specified in the user query. Alternatively, the data that has been mapped may be all data within all of the files in the data source, thereby enabling the data to be mapped for access in subsequent queries. From this mapping (e.g., intermediary data structure(s)), the requested data is obtained. In this manner, data is obtained from the virtual relational database.

In order to expedite data access, data that has been requested via the user query may be stored in memory, while the remaining data that has not been requested may be stored in disk.

A report including the data is then provided at block 808 corresponding to the requested report format. During generation of a report, custom or standard expressions or functions may be applied to the data. For instance, the data may be summed or otherwise manipulated for displaying in the report. In this manner, the user may effectively query a relational database, since the mapping to a hierarchical file structure is transparent to the user.

The manipulations of data described herein are often referred to in terms, such as storing, providing, or generating. In any of the operations described herein that form part of the present invention, these operations are machine operations. Useful machines for performing the operations of the present invention include general-purpose digital computers, networks of such computers, or other programmable systems. In all cases, there is a distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

Still further, the present invention relates to machine-readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

A preferred computer system invention includes a server and one or more clients. In preferred embodiments, software providing the disclosed functionality is provided on the server and can be accessed through the various clients. The server in accordance with the present invention includes a central processing unit (CPU), input/output (I/O) circuitry, and memory—which may be read only memory (ROM) and/or random access memory (RAM). The server may also optionally include a display, a mass storage unit, a keyboard, and a clock.

In one embodiment, the CPU is preferably one or more microprocessor chips selected from complex instruction set computer (CISC) microprocessors, reduced instruction set computer (RISC) microprocessors, or other available microprocessors. The CPU is coupled to a memory by a bi-directional data bus, but may also be coupled by a unidirectional data bus in the case of ROM. The memory is also coupled to the CPU by appropriate control and address busses, as is well known to those skilled in the art.

The CPU is coupled to the I/O circuitry by a bi-directional data bus to permit data transfers with peripheral devices. I/O circuitry preferably includes a number of latches, registers and direct memory access (DMA) controllers. The purpose of the I/O circuitry is to provide an interface between CPU and such peripheral devices as display assembly, mass storage (e.g., disks), keyboard, and clients. The display assembly of server receives data from the I/O circuitry via the bus and displays that data on a suitable screen. Mass storage can be coupled to I/O circuitry by a bi-directional data bus. Generally, mass storage will be a hard disk drive, a tape drive, or some other long-term storage device. It may be used to store report templates (e.g., template objects) of this invention, programs for accessing or generating such report templates, programs for viewing such report templates, and programs for generating a report from such report templates.

The keyboard communicates with the CPU via data bus and I/O circuitry. In addition to keyboard, other types of input device can also be used in conjunction with the present invention. For example, a computer mouse, a track ball, a track pad, or a pen-based tablet can be used to manipulate a pointer on display screen. A clock preferably comprises a real-time clock to provide real-time information to the system. Alternatively, the clock can simply provide regular pulses to, for example, an interrupt port of the CPU, which can count the pulses to provide the time function. The clock is coupled to the CPU by a data bus.

The clients may include terminals, personal computers, workstations, minicomputers, and mainframes. For purposes of this invention, any data processing devices which can access the report templates (e.g., report objects) or report template generating software on server are clients. It should be understood that the clients may be manufactured by different vendors and may also run different operating systems such as MS-DOS, Microsoft Windows, Microsoft NT, various forms of UNIX, OS/2, MAC OS and others. Clients are connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. As with the clients, it should be understood that the server may run different operating systems such as MS-DOS, Microsoft Windows, Microsoft NT, UNIX, VMS, OS/2, MAC OS and others. The clients need not use the same operating system as the server.

It is also within the scope of this invention to implement the apparatus and methods for generating, storing, viewing, and accessing report templates and report template objects on a "stand-alone" computer that does not form part of a network.

Although the foregoing invention has been described in some detail for purposes of clarity of understanding, it will be apparent that certain changes and modifications may be practiced within the scope of the appended claims. For instance, although the specification has described an example employing objects used to generate a report template and associated spreadsheet report, different types of objects and data structures may be used as well. Moreover, the report that is generated may be any type of report, and therefore need not be a spreadsheet report. In addition, the reader will understand that the flat and hierarchical file formats described herein are illustrative only. Thus, the methods, apparatus, and data structures for generating a report template or report as disclosed herein may be used with other types of file formats and their equivalents.

What is claimed is:

1. A method of generating a report, comprising:
    obtaining a query via a graphical user interface using a virtual relational database such that data in a data source appears to be stored in a relational database, the data source including one or more files having a hierarchical file format, the virtual relational database including one or more virtual tables, each of the virtual tables including one or more virtual columns, wherein the query identifies at least one of the virtual tables and at least one of the virtual columns of the virtual relational database, wherein a mapping maps the virtual relational database to at least a portion of the data in the data source, wherein the virtual relational database does not store data;
    obtaining data corresponding to the query using the mapping, wherein the data is not obtained from a relational database, wherein the data is not stored in a relational database;
    generating a report including the obtained data;
    wherein the hierarchical file format includes a plurality of data elements, each of the plurality of data elements having an element name;
    wherein each of the virtual columns corresponds to one of the plurality of data elements, wherein generating a mapping comprises:
        incrementing a number upon encountering one of the plurality of data elements or a closing tag for the one of the plurality of data elements, wherein the one of the plurality of data elements is associated with one of the virtual columns; and
        inserting the number as a primary key into at least one of the files or an intermediary data structure such that the number identifies the one of the virtual columns.

2. The method as recited in claim 1, further comprising:
    defining a relationship between the virtual tables in response to input received via the graphical user interface.

3. The method as recited in claim 2, wherein defining a relationship between the virtual tables comprises:
    defining a virtual primary key.

4. The method as recited in claim 2, wherein defining a relationship between the virtual tables comprises:
    defining a virtual foreign key.

5. The method as recited in claim 1, further comprising:
defining a column name for each of the virtual columns in response to input received via the graphical user interface.

6. The method as recited in claim 1, further comprising:
defining a table name for each of the virtual tables in response to input received via the graphical user interface.

7. The method as recited in claim 1, further comprising:
modifying one or more of the virtual tables in response to input received via the-graphical user interface.

8. The method as recited in claim 1, further comprising:
removing one or more of the virtual columns from one of the virtual tables in response to input received via the graphical user interface.

9. The method as recited in claim 1, further comprising:
adding one or more virtual columns to one of the virtual tables in response to input received via the graphical user interface.

10. The method as recited in claim 1, further comprising:
deleting one or more of the virtual tables in response to input received via the graphical user interface.

11. The method as recited in claim 1, wherein the data source comprises:
a plurality of files, wherein a first set of one or more of the files have a first hierarchical file format and wherein a second set of one more of the files have a second hierarchical file format, wherein the mapping is performed for the first set of files and the second set of files.

12. The method as recited in claim 11, wherein a first set of individuals has access to the first subset of the plurality of files and a second set of individuals has access to the second subset of the plurality of files, thereby restricting access to the data elements in the plurality of files.

13. The method as recited in claim 1, further comprising:
parsing the one or more files to obtain data corresponding to the one or more virtual columns.

14. The method as recited in claim 1, wherein the element name is associated with one or more paths in one or more of the files.

15. The method as recited in claim 14, wherein the element name corresponds to a single level in the hierarchical file format.

16. The method as recited in claim 14, wherein the element name corresponds to all levels in the hierarchical file format.

17. The method as recited in claim 14, further comprising:
creating a primary key for one of the virtual columns, the one of the virtual columns corresponding to one of the plurality of data elements;
storing a value of the primary key for the one of the virtual columns;
assigning the value to a foreign key; and
inserting the value of the foreign key into at least one of the plurality of files or an intermediary data structure;
wherein the value of the primary key and foreign key identify the one of the virtual columns.

18. The method as recited in claim 17, further comprising:
encountering the one of the plurality of data elements or a closing tag for the one of the plurality of data elements; and
incrementing the value of the primary key when the one of the plurality of data elements or closing tag for the one of the plurality of data elements is encountered.

19. The method as recited in claim 17, wherein creating, storing, assigning and inserting are performed for each of the plurality of data elements.

20. The method as recited in claim 1, further comprising generating the mapping, wherein generating the mapping comprises:
mapping each of the virtual tables and each of the virtual columns to an element name in response to input received via the graphical user interface.

21. The method as recited in claim 20, wherein each of the virtual tables has an associated table definition and each of the virtual columns has an associated column definition, wherein each table definition and column definition is defined at least in part by the corresponding element name.

22. The method as recited in claim 20, wherein each of the virtual tables has an associated table definition and each of the virtual columns has an associated column definition, wherein each table definition and column definition is defined at least in part by the element name.

23. The method as recited in claim 22, further comprising:
modifying a table definition such that the virtual table is defined by a different element name in response to input received via the graphical user interface.

24. The method as recited in claim 22, further comprising:
modifying a column definition such that the virtual column is defined by a different element name in response to input received via the graphical user interface.

25. The method as recited in claim 1, wherein each of the virtual columns and virtual tables has an associated name that has been received via the graphical user interface.

26. The method as recited in claim 1, further comprising:
adding a column definition defining a virtual column in response to input received via the graphical user interface.

27. The method as recited in claim 1, further comprising:
deleting a table definition defining a virtual table in response to input received via the graphical user interface.

28. The method as recited in claim 1, further comprising:
deleting a column definition defining a virtual column in response to input received via the graphical user interface.

29. The method as recited in claim 1, wherein inserting the number as a primary key comprises:
inserting a virtual primary key into at least one of the files, wherein the virtual primary key is user defined.

30. The method as recited in claim 1, further comprising:
inserting the number as a foreign key into at least one of the files, wherein the foreign key identifies the one of the virtual columns.

31. The method as recited in claim 1, wherein obtaining data comprises:
obtaining the data from the files having the hierarchical file format.

32. The method as recited in claim 1, wherein obtaining data comprises:
obtaining the data from an intermediary data structure in which the mapping has been generated.

33. The method as recited in claim 1, wherein the query identifies one or more of the virtual tables and one or more of the virtual columns in the virtual relational database.

34. The method as recited in claim 1, wherein obtaining data comprises:
obtaining data from the data source mapped to the relational database model.

35. The method as recited in claim 1, wherein a tree data structure maps data from the data source to the virtual relational database, wherein obtaining data comprises:
obtaining data from the tree data structure corresponding to the query.

36. The method as recited in claim 35, wherein the data from the data source that is mapped to the virtual relational database is limited to data obtained from the data source corresponding to the query.

37. The method as recited in claim 35, wherein the data from the data source that is mapped to the virtual relational database includes all data in the data source.

38. The method as recited in claim 1, wherein the data from the data source that is mapped to the virtual relational database is limited to data obtained from the data source corresponding to the query.

39. The method as recited in claim 1, wherein the data from the data source that is mapped to the virtual relational database includes all data in the data source.

40. The method as recited in claim 1, further comprising:
presenting the relational database model via the graphical user interface, enabling a user to submit a query using the relational database model.

41. The method as recited in claim 1, further comprising:
presenting one or more of the virtual columns of the virtual relational database via the graphical user interface.

42. The method as recited in claim 41, wherein presenting one or more of the virtual columns comprises:
hiding at least one of the virtual columns.

43. The method as recited in claim 41, wherein all of the virtual columns are not presented via the graphical user interface.

44. The method as recited in claim 1, wherein the query establishes a format of the report to be generated from what appears to be a relational database.

45. The method as recited in claim 44, further comprising:
presenting the format of the report to be generated, thereby enabling a user to view and establish the format of the report to be generated from what appears to be a relational database.

46. The method as recited in claim 1, further comprising:
assigning the number to a foreign key; and
inserting the number assigned to the foreign key into at least one of the plurality of files or an intermediary data structure.

47. A computer-readable medium storing thereon computer-readable instructions that when executed on a computer cause the computer to generate a report, comprising:
instructions for obtaining a relational database model, the relational database model including one or more virtual tables, each of the virtual tables including one or more virtual columns;
instructions for generating a mapping between the relational database model and at least a portion of data in a data source, the data source including one or more files having a hierarchical file format, each of the files including one or more data elements;
instructions for obtaining a query via a graphical user interface using the relational database model such that the data appears to be stored in a relational database, wherein the query identifies at least one of the virtual tables and at least one of the virtual columns, wherein the relational database model does not store data;
instructions for obtaining data corresponding to the query using the mapping, wherein the data is not obtained from a relational database, wherein the data is not stored in a relational database; and
instructions for generating a report including the obtained data;
wherein the hierarchical file format includes a plurality of data elements, each of the plurality of data elements having an element name;
wherein each of the virtual columns corresponds one of the plurality of data elements, wherein the instructions for generating a mapping further comprises:
instructions for incrementing a number upon encountering one of the plurality of data elements or a closing tag for the one of the plurality of data elements, the one of the plurality of data elements being associated with one of the virtual columns; and
instructions for inserting the number as a primary key into at least one of the files or an intermediary data structure, wherein the number identifies the one of the virtual columns.

48. The computer-readable medium as recited in claim 47, wherein the plurality of data elements are nested to indicate hierarchical relationships between the plurality of data elements.

49. The computer-readable medium as recited in claim 47, wherein the instructions for generating a mapping comprises:
instructions for generating a tree data structure mapping the relational database model to the hierarchical file format.

50. The computer-readable medium as recited in claim 47, further comprising:
instructions for inserting the number as a foreign key into at least one of the files or an intermediary data structure, wherein the foreign key identifies the one of the virtual columns.

51. An apparatus for generating a report, comprising:
a processor; and
a memory, at least one of the processor and the memory being adapted for:
obtaining a relational database model, the relational database model including one or more virtual tables, each of the virtual tables including one or more virtual columns;
generating a mapping between the relational database model and at least a portion of data in a data source, the data source including one or more files having a hierarchical file format, each of the files including one or more data elements;
obtaining a query via a graphical user interface using the relational database model such that the data appears to be stored in a relational database, wherein the query identifies at least one of the virtual tables and at least one of the virtual columns, wherein the relational database model does not store data, wherein the data is not stored in a relational database;
obtaining data corresponding to the query using the mapping, wherein the data is not obtained directly or indirectly from a relational database; and
generating a report including the obtained data;
wherein the hierarchical file format includes a plurality of data elements, each of the plurality of data elements having an element name;
wherein each of the virtual columns corresponds to one of the plurality of data elements, wherein generating a mapping further comprises:
incrementing a number upon encountering one of the plurality of data elements corresponding with one of the virtual columns or upon encountering a closing tag for the one of the plurality of data elements corresponding with the one of the virtual columns; and
inserting the number associated with the one of the virtual columns as a primary key into at least one of the files or an intermediary data structure, the primary key identifying the one of the virtual columns.

52. The apparatus as recited in claim 51, wherein generating a mapping comprises:
  generating a tree data structure mapping the relational database model to at least a portion of data from the data source.

53. A method of generating a report, comprising:
  identifying a data source including one or more files having a hierarchical file format including data;
  obtaining a relational database model, the relational database model including one or more virtual tables, each of the virtual tables including one or more virtual columns, wherein the relational database model does not store the data;
  mapping the relational database model to the hierarchical file format by mapping each of the virtual tables and each of the virtual columns to an element name or path in the corresponding file in response to input received via a graphical user interface, wherein the data is not stored in a relational database;
  receiving a query that identifies at least one of the virtual tables and at least one of the virtual columns of the relational database model; and
  generating a report in response to the query;
  wherein the files include a plurality of data elements, each of the plurality of data elements having an element name;
  wherein each of the virtual columns corresponds to one of the plurality of data elements, wherein mapping the relational database model to the hierarchical file format comprises:
    incrementing a number upon encountering one of the plurality of data elements in at least one of the files or upon encountering a closing tag for the one of the plurality of data elements in at least one of the files, the one of the plurality of data elements corresponding with one of the virtual columns; and
    inserting the number as a primary key into the at least one of the files or an intermediary data structure, the primary key identifying the one of the virtual columns.

54. The method as recited in claim 53, wherein a column name associated with each of the virtual columns corresponds to an element name of one of the plurality of data elements.

55. The method as recited in claim 53, further comprising:
  adding a table definition defining a virtual table in response to input received via the graphical user interface.

56. The method as recited in claim 53, wherein the query establishes a format of the report to be generated from what appears to be a relational database.

57. The method as recited in claim 56, further comprising:
  presenting the format of the report to be generated, thereby enabling a user to view and establish the format of the report to be generated from what appears to be a relational database.

58. The method as recited in claim 53, wherein the query is received such that the data appears to be stored in a relational database.

59. The method as recited in claim 53, further comprising:
  presenting the virtual tables and virtual columns via a graphical user interface.

60. The method as recited in claim 59, wherein the virtual tables represent tables in a relational database.

61. The method as recited in claim 53, wherein the virtual tables represent tables in a relational database.

62. The method as recited in claim 53, wherein mapping the relational database model to the hierarchical file format further comprises:
  inserting the number as a foreign key into at least one of the files or an intermediary data structure, wherein the foreign key identifies the one of the virtual columns.

* * * * *